Patented Oct. 3, 1944

2,359,697

UNITED STATES PATENT OFFICE 2,359,697

CHROMIUM RECOVERY

Marvin J. Udy, Niagara Falls, N. Y.

No Drawing. Application January 25, 1939,
Serial No. 252,743

12 Claims. (Cl. 23—56)

This invention relates to the recovery and utilization of chromium and chromium compounds and has for an object the provision of certain improvements in processes for producing chromium compounds and in processes for utilizing chromium compounds. A particular object of the invention is to provide certain improvements in processes for producing chromate compounds and in processes for utilizing chromate compounds. A further object of the invention is to provide an improved method of treating chromite ores for the production of chromate compounds. The invention further contemplates the treatment of materials containing spinels comprising ferrous oxide, alumina and chromic oxide to produce altered spinel products containing ferrous oxide and alumina in proportions, relatively to chromic oxide, smaller than in the spinels of the original chromium-bearing material and oxidation of the altered spinel products to produce chromate compounds. The invention also contemplates the production of improved chromium-bearing materials and improved composite reagents for use in producing ferrochromium and for use in incorporating chromium in iron and steel, the provision of improved methods of producing chromium-bearing materials and improved composite reagents for such uses and the provision of improved methods of producing ferrochromium and chromium-bearing iron and steel products. The invention further contemplates the provision of composite reagents of various compositions suitable for effective and efficient use in operations characterized as to type by performance in electric furnaces, combustion furnaces, foundry ladles, crucibles and other types of equipment.

The invention involves the treatment by oxidation of altered chromium-bearing material in which chromic oxide ($Cr_2O_3$) contained therein is so associated with one or more basic compounds as to facilitate oxidation of the chromic oxide to chromium trioxide ($CrO_3$) and combination of the chromium trioxide thus produced with the one or more basic compounds to form one or more chromates. Alteration of crude chromium-bearing material may be effected by subjecting the material to a fusion treatment in the presence of one or more basic compounds such, for example, as lime (CaO) and magnesia (MgO). Oxidation may be carried out under any suitable conditions and in the presence of any suitable basic compound capable of combining with chromium trioxide produced in the oxidation treatment. The products of the oxidation treatments may be employed directly for various uses, as, for example, in the production of chromium-bearing alloys, or, the products of the oxidation treatments may be treated for the recovery of relatively pure chromate compounds (in the form of normal chromates or in the form of bichromates, for example), and the relatively pure chromate compounds may be employed for any suitable purposes. Because of economical recovery of chromate compounds permitted by the invention, the chromate compounds are made available for advantageous and economical use in metallurgical operations involving the production of metallic chromium and chromium-bearing alloys, and the invention contemplates the use of the chromate compounds in various metallurgical procedures and in the production of reagents for use in various metallurgical procedures. Recovery of the chromate compounds from the associated materials may be accomplished in any suitable manner. A preferred process of my invention includes a concentrating operation to produce high-chromium concentrates which are admirably suitable for use in the production of relatively pure chromate compounds. A particular advantage of the invention is that it provides for efficient, effective and economical recovery of calcium chromate directly from crude chromium-bearing materials.

According to some procedures proposed heretofore, chromite ore, mixed with lime (CaO) and soda ash is heated under oxidizing conditions to oxidize the chromium of the ore with the production of chromates of calcium and sodium which are separated from the gangue materials and suitably treated for the recovery of desired chromate compounds. It has been proposed, also, to subject chromite ore to oxidation treatments in the presence of basic compounds like lime and at temperatures sufficiently low to permit the formation of chromates and to employ the resulting oxidized products in metallurgical operations involving exothermic reactions or involving oxidation of impurities from molten metal to utilize the added oxygen. Such oxidation treatments have been designed to improve the recovery of chromium by conversion of highly refractory minerals of natural ore to less refractory artificial minerals. Other proposals of the prior art include the use of common chromate compounds in reducing operations for the recovery of chromium contained therein.

The chromium of chromite ores usually is present in the spinel type mineral,

$$MgO.FeO(Cr_2O_3Al_2O_3)$$

and the gangue materials associated with this mineral in the ore usually contain silica ($SiO_2$), magnesia (MgO) and alumina ($Al_2O_3$). I have found that, in some rare instances, notably in some Canadian deposits, magnesia in the ore as mined is present in the gangue materials combined with carbon dioxide as magnesium carbonate, but usually the magnesia of the gangue materials is all or largely combined with the silica and alumina, probably as magnesium-aluminum-silicate. In the usual chromite ore, the gangue materials are so widely disseminated and so intimately intermixed with the spinels that a high degree of oxidation of the chromium of the chromite ore in a reasonable period of time is impossible unless the ore is ground virtually to an impalpable powder and carefully and thoroughly mixed with basic compounds like lime and soda ash. Grinding of the natural ore to a degree of fineness such that a substantial recovery of chromium in the form of chromate can be made is expensive, and even under optimum conditions of grinding or subdivision, an excessive amount of lime, or similar reagent, is required to prevent undesirable sintering or fusion which will interfere with, prevent or inhibit the oxidation reactions. Under optimum conditions with respect to fine-grinding or sub-division of natural chromite ores, according to heretofore customary practices, the roasting or oxidation charges may require lime (CaO) amounting to three and one-half times as much as the ore, by weight. Such charges are undesirably large in volume and weight, and they limit materially the effective capacity of the roasting or oxidizing equipment.

Operations designed to improve the recovery of chromium as metallic chromium by subjecting chromite ores to oxidation treatments (prior to reduction) to form calcium chromate have not been highly successful commercially because they have been incapable of accomplishing high degrees of conversion of the chromium-bearing spinels to more readily reducible forms. The spinels of chromite ores are not readily broken down at the relatively low temperatures required for chromate production and in the wide states of dispersion in which they exist in the ores.

Relatively pure chromate compounds have been produced heretofore only at costs which prohibit their use in ordinary metallurgy.

The present invention is based on my discovery that chromium-bearing materials of the nature of chromite ore can be made more amenable to treatment for the production of chromate compounds if a charge of the ore and lime (CaO, calcium oxide) or magnesia (MgO, magnesium oxide) or a mixture of lime and magnesia in controlled amounts or proportions is heated to a temperature at least sufficiently high to sinter constituents of the charge. Such heating may be merely sufficient to bring about a sintering of the constituents of the charge or may be sufficiently intense to cause a melting of the charge. The term "fusion treatment," or similar terms, hereinafter sometimes are used as a generic term to refer to a heating treatment which may be of such intensity as merely to sinter constituents of the charge or sufficiently intense to cause some melting of the charge. The fusion treatment results in bringing magnesia or lime and magnesia into chemical combination with chromic oxide normally chemically combined with ferrous oxide and, consequently, promotes the conversion of the chromic oxide to chromium trioxide and chemical combination of the resulting chromium trioxide with the lime and magnesia chemically combined before oxidation with the chromic oxide. The fusion treatment appears to result also in concentration of the chromium-bearing minerals into larger particles which may be brought into contact with added basic compounds more effectively for oxidation. I have discovered, also, that chromite ore can be fused with lime in amounts such as to produce self-disintegrating products which products are admirably suited for use in the production of chromate compounds.

By fusing chromium-bearing materials containing minerals of the spinel type and thereafter subjecting the product of the fusion treatment to a concentration treatment in accordance with the invention, I obtain concentrates comprising altered spinel type minerals which altered minerals contain chromic oxide in greater proportions by weight and chromium and iron in higher ratios of chromium to iron than the spinel type minerals of the original chromium-bearing materials. The altered mineral products of my invention may be sufficiently free of ferrous oxide and alumina to approximate true magnesium chromite in composition or they may contain ferrous oxide and alumina in controlled relatively small amounts. In practicing my invention in one of its preferred forms, I prefer to form and recover altered mineral concentrates containing not less than about fifty percent (50%) by weight of chromic oxide and chromium and iron in proportions to give a ratio of chromium to iron above three to one (3:1). I have produced altered mineral concentrates containing more than sixty percent (60%) and even as high as seventy-eight percent (78%) chromic oxide by weight. All concentrates contained iron and alumina in proportions relatively to chromic oxide lower than contained in the spinel type minerals of the original chromium-bearing materials. Chromite ores constitute the principal raw materials from which chromium is recovered, and, therefore, the invention will be described hereinafter more particularly with reference to the treatment of such ores for the recovery of the altered mineral products and concentrates of the invention.

The altered mineral concentrates obtained in practicing the invention constitute very desirable sources of chromium for industrial uses in which high-chromium sources of chromium are desirable or required. The concentrates are particularly well adapted for use in the economical production of relatively pure chromium compounds which may be used advantageously in the production of alloys containing chromium and other metals as, for example, in the production of chromium-bearing iron and steel products. The invention is capable of producing concentrates free of carbon and such concentrates may be employed to great advantage in the production of ferrochromium and chromium-bearing iron and steel products. In producing the composite reagents of my invention, which reagents are particularly well adapted for use in producing ferrochromium and in producing chromium-bearing iron and steel products, I preferably employ concentrates obtained from the products of fusion treatments to produce relatively pure chromium compounds, but I may employ relatively pure chromium compounds from any source.

The composite reagents of my invention preferably comprise mixtures containing relatively pure chromium compounds and one or more solid, non-carbonaceous reducing agents such, for example, as calcium, aluminum or silicon or an alloy of calcium, aluminum or silicon with one or more other elements: for example, calcium silicide, ferrosilicon, ferrochrome silicon, aluminum silicide or ferroaluminum silicon. The chromium compounds and the non-carbonaceous reducing agent preferably are finely divided and intimately mixed. The degree of sub-division and intimacy of mixing in any case will depend to some extent at least on the particular manner in which the composite reagent is to be used. When the heat developed as the result of reaction between the components of a composite reagent is to be relied upon largely or entirely for promoting and continuing the reaction and for melting the reaction products, the degree of sub-division and intimacy of mixing of the components preferably are such that every particle of reducible material contained in the mixture is in direct and substantially complete contact with particles of reducing agent. I have found that such intimate contact requires a degree of comminution such that a large proportion of the chromium-bearing material and the reducing agent consists of particles sufficiently small to pass a 100-mesh screen (Tyler series) and grinding of the materials in contact, or together. When substantial amounts of heat are available, as, for example, when the composite reagents are to be treated in electric furnaces, the components need not be so finely divided and mixing need not be so intimate.

Any suitable relatively pure compound which can be derived or obtained from the oxidized products produced in accordance with the invention may be employed in producing composite reagents. Such compounds include, for example, chromates, bichromates and chromites of alkali and alkaline earth metals, and these products may be employed alone or in various combinations or mixtures containing two or more, and, when used alone or in various combinations or mixtures of two or more, they may be mixed with chromium-bearing materials of any desired degrees of purity derived from other sources. Suitable mixtures may comprise, for example, chromates and chromites proportioned properly for desirable heat control. The chromite proportion of such a mixture, or any part of it, may be obtained by heating a chromate produced in accordance with the invention, or derived from any other source, at a temperature sufficiently high to liberate or drive off a portion of its oxygen content. The chromate proportion, or any part of it, may be provided or obtained by controlling the oxygen liberation to retain a portion of the chromate in unaltered form, or, chromite and chromate from separate lots or sources may be mixed in desired proportions. The altered mineral concentrates provide another desirable source of chromite for admixture with chromate. For high temperature operations, the concentrates may be employed in unaltered forms. For low temperature operations, I prefer to convert the magnesium chromite of the concentrates to calcium chromite by heating with lime, as reduction of the chromium of magnesium chromite spinels is very difficult except at high temperatures.

I prefer to employ chromite and chromate compounds of calcium when employing silicon-containing reducing agents in order to provide available lime (calcium oxide, CaO) for fluxing silica ($SiO_2$) produced.

The composite reagents of the invention and smelting charges of the invention employing the oxidized products directly, preferably are free or substantially free, of water in any form. The chromate and chromite compounds employed preferably are anhydrous. Water in any form interferes with the smoothness of reactions and requires the generation of additional heat for its elimination with consequent loss in efficiency. I have found that amounts of water in excess of five-tenths of one percent (0.5%) by weight in the composite reagents and smelting charges are particularly undesirable, and, therefore, I prefer to employ composite reagents and smelting charges containing substantially lower amounts of water.

In preferred composite reagents of the invention, the reducible materials and the reducing agents are so proportioned and so mixed that the mixtures will react exothermically within themselves, in the particular environments in which they are employed, to produce readily separable molten metal and slag phases or products. Desirably, for purposes of economy, little or no reducing agent beyond the exact amount required to accomplish a result sought is employed in any case.

The novel chromite products and the novel chromite-chromate mixtures of the invention may be employed in reaction and smelting charges of any suitable compositions, in any suitable particle sizes and mixed with other components in any suitable degree of intimacy, and they may be employed for any non-metallurgical or other purpose for which they may be suitable.

Smelting charges comprising the products resulting from oxidation of the products of the fusion treatments may include any suitable reducing agent, but they preferably include a non-carbonaceous reducing agent such as ferrochrome silicon. Such charges preferably are smelted in electric furnaces, because they may contain substantial amounts of magnesium chromite spinel from which chromium is difficultly reducible except at high temperatures. They may be smelted in combustion furnaces, of the open hearth type for example, when relatively low recoveries of chromium are satisfactory or when prior treatments have resulted in the breaking down of the magnesium spinel or conversion of the magnesium spinel to a less refractory mineral or compound. Oxidation of the products of the fusion treatments accomplishes the two-fold purpose of conversion of chromite to chromate and elimination of carbon with which the product might have become contaminated in a preceding operation as, for example, in a fusion operation employing carbon or a carbonaceous reducing agent for fractional or preferential reduction of the iron of displaced ferrous oxide. Products of fusion treatments which are contaminated with carbon may be subjected to oxidation treatments primarily to effect carbon removal and the resulting carbon-free or substantially carbon-free material may be employed to produce ferrochromium or chromium iron and steel products by reduction with a non-carbonaceous reducing agent such as ferrosilicon or ferrochrome silicon. Oxidation to effect carbon removal preferably is conducted at temperatures above 1200° C. and below the fusing temperature of the material, and, if chromate formation is desired, the material may be maintained subsequently at a temperature below 1200° C. and preferably slightly below 1000° C. for a period of time sufficiently long to permit the desired degree of conversion to chromate.

Depending upon the conditions under which the various composite reagents are to be employed, they may contain additional oxygen containing substances to provide additional heat for melting metal and slag produced. Usually, no additional oxidizing agent will be required, but, if necessary or desirable, any of the common oxidizing agents such, for example, as sodium nitrate, sodium chlorate and manganese dioxide may be employed for promoting oxidation of silicon or other reducing agent with the resultant production of additional heat. Such oxidizing agents are required, for example, when the reaction mixtures contain large amounts of inert materials such as slag-forming materials, and they are employed in amounts (together with the necessary reducing agent) sufficient to produce enough heat to melt the metal and slag produced and give the slag the desired fluidity. The addition of such oxidizing agents requires additional silicon, when silicon is employed for reduction, and the total amounts of silicon and available oxygen are so proportioned as to provide about the theoretical amount of silicon for combining with the available oxygen. If excess silicon is used, the excess will enter the metal produced, control of this being effected in the use of reducible materials and high lime slags.

The invention may be employed in the treatment of chromite ores of any grade, but it is of particular importance with respect to the matter of utilizing the so-called low-grade ores, that is, ores containing low percentages of chromium and ores which contain iron and chromium in ratios of iron to chromium too high to permit them to be utilized for the recovery of chromium for industrial uses in processes of the type employed heretofore for chromium recovery. The invention presents a solution of the problem of utilization of such so-called low-grade ores, a solution of major importance to countries requiring chromium for industrial uses, but having available only deposits of low-grade ores. The invention provides a further specific advantage of importance by permitting the use of combustion furnaces in preliminary fusion treatments to condition chromite ores for subsequent concentration treatments with recovery of high-grade concentrates.

As suggested above, treatment of the usual chromite ore to produce chromate with high recovery of chromium may require preliminary fine-grinding to such a degree as to make high recovery of chromium uneconomical. Such a degree of fine-grinding may result, also, in destruction of the properties of the components of the ore by virtue of which they might be selectively separable in known concentration processes. In this connection, it may be noted that, in the usual chromite ores, the gangue materials are so widely disseminated and so intimately intermixed with the spinels that concentration by known methods with recovery of substantially pure spinel particles is virtually impossible when the usual degrees of fine-grinding are accomplished.

Fusion of chromite ores in accordance with my invention appears to result in concentration of the spinels into relatively large and relatively pure particles with increase in specific gravity. This concentration of the spinels in relatively large particles appears to permit more effective contact of chromic oxide with oxygen of the air and with basic compounds such as lime and soda ash with a consequent increase in the rate of conversion of chromic oxide to chromium trioxide and production of sodium or calcium chromate or both. Concentration of the spinels into relatively large and relatively pure particles, with increase of specific gravity, also makes the spinels more amenable to recovery by ordinary concentration methods. The spinels and associated gangue materials are so altered that they may be separated readily by ordinary concentration methods, with the production of tailing products low in chromium oxide and concentrate products high in chromium oxide. The present invention contemplates the direct utilization for the production of chromate compounds of products resulting from fusion treatments of chromite ores and the utilization for the production of chromate compounds of concentrates obtained as the result of concentration treatments of products resulting from fusion treatments of chromite ores. Chromate production processes and chromate recovery processes are facilitated by the use of concentrates because of the smaller charges which may be employed and because the absence of gangue materials which normally accompany chromite ores promotes more effective contact of reagents and solvents.

My researches and experiments have indicated that when a chromite ore is fused with lime (calcium oxide) there is a displacement of the magnesia of the silicate portion of chromite ore from its combinations with silica and alumina and displacement, in turn, of the ferrous oxide from the spinel type mineral by the magnesia displaced from its combinations with silica and alumina. It appears, also, that there results a rearrangement of the alumina and silica in the presence of the lime with the production of calcium-aluminum-silicate. The tendency of the alumina ($Al_2O_3$) is to divide between the silicate and chromite portions with a somewhat greater percentage in the silicate. When the lime is present in the charge in amount sufficient to displace all of the magnesia combined with silica or to form di-calcium silicate with the silica present in the charge, the product of the fusion treatment will have the characteristic or property of self-disintegration.

The inclusion of chromium-free acid components such as alumina in charges to be subjected to the fusion treatments of the invention preferably is avoided unless provision is made for preventing introduction of such components into the altered spinel type minerals produced, as the introduction of such components into the altered minerals tends to inhibit oxidation of the chromic oxide contained therein. The preferred charges of the invention (for the fusion treatments) consist of chromite ore and a suitable basic component such as lime. When a disintegrating product is sought, silica may be included if necessary, and, if fractional reduction of displaced ferrous oxide is desired, a reducing agent may be included in the charge to be treated.

Magnesium oxide may be employed instead of calcium oxide to effect direct displacement of the ferrous oxide from the spinel type mineral, but I prefer to employ calcium oxide or calcium oxide and magnesium oxide together, rather than magnesium oxide alone because of advantages in furnace operating characteristics and in the properties of the altered ore resulting from the use of lime (calcium oxide). The invention will be described hereinafter more particularly with respect to the use of lime in the fusion treatment. The lime and magnesia, or either, may be employed as such, that is, as calcium oxide and magnesium oxide, or either or both may be employed in the carbonate or other form which will be converted to the oxide form in the fusion treatment.

As already has been indicated, fusion of a charge containing lime and chromite ore may be carried out at a relatively low temperature of incipient fusion at which a product in the form of clinker will be produced, or, fusion of the charge may be carried out at a relatively high temperature at which a product in the form of a molten bath will be produced. Fusion treatments of the invention may be carried out in any suitable type of furnace or heating equipment. For heating charges to temperatures of incipient fusion, I prefer to employ combustion heated furnaces of the type of cement kilns and, for heating charges to melting temperatures, I prefer to employ the submerged arc type electric furnace. Other types of combustion furnaces which may be employed for fusion include cupolas and blast furnaces.

If the lime is present in the charge in an amount less than or substantially in excess of the amount required to form di-calcium silicate, the product of the fusion treatment may not possess the property of self-disintegration. Also, if the amount of silica present in the charge is not sufficient to permit the formation of a substantial amount of di-calcium silicate, the product of the fusion treatment may not be self-disintegrating, but, on the contrary, may set from the fused state as a hard, vitreous mass when the fusion treatment is carried out at a temperature sufficiently high to form a molten product, or as hard, vitreous clinkers when the fusion treatment is carried out at a relatively low temperature of incipient fusion.

In practicing my invention, I may employ charges of any suitable compositions in the fusion treatments, and I may produce either disintegrating or non-disintegrating fused products. I prefer to employ charges containing lime and silica in proportions such that self-disintegrating products will result from the fusion treatments. I have found charges made from ore containing about six percent (6%) or more of silica to be satisfactory for producing self-disintegrating products when suitable amounts of lime also are included in the charges. Chromite ores usually contain sufficient silica, but silica may be added to effect the production of self-disintegrating products when ores deficient in silica are undergoing treatment. To insure the production of a self-disintegrating fused product, a charge to be subjected to a fusion treatment should contain a total amount of lime (CaO) or magnesia (MgO) or both at least equivalent molecularly to the chromic oxide ($Cr_2O_3$) of the charge plus an amount of lime (CaO) equivalent to two molecules of lime (CaO) for each molecule of silica in the charge. Usually, the amount of lime included in a charge to be fused should be in excess of the amount theoretically required to produce dicalcium silicate with the silica present when a self-disintegrating product is sought. The necessity for using a charge containing such an excess of lime probably results from the fact that a portion of the lime enters into various combinations with the magnesia, alumina, chromium oxide and ferrous oxide present in the charge and is not available to form di-calcium silicate. Usually, an amount of lime about ten percent (10%) to forty or fifty percent (40 or 50%) in excess of the amount theoretically required to form dicalcium silicate with the silica in a charge will result in the production of a self-disintegrating product through fusion of the charge.

When a charge comprising chromite ore is subjected to a fusion treatment in the presence of lime, the ore is altered or converted from a substantially acid-insoluble product to a product which may be dissolved or broken down with acids, and, according to one aspect of my invention, I utilize the change in susceptibility to attack by acids as an aid to the recovery of high grade concentrates by means of suitable acid treatments. The degree of conversion depends upon the amount of lime employed. With a small amount of lime, the impurities associated with the spinel type mineral of the ore become susceptible to attack by acids, and, as the amount of lime employed is increased, the alumina of the spinel type mineral is displaced or removed and enters into combination with the excess lime. As the amount of lime is increased, there is also a tendency for the chromium oxide to become acid soluble, and, conceivably, the entire chromic oxide content of an ore can be rendered acid-soluble through the use of lime in sufficient quantity. The progressively increasing susceptibility of the ore to attack by acids with increasing solubility of the chromic oxide through the use of progressively increased amounts of lime may be attributed to progressive alteration of the spinel type mineral of the ore with lime first causing (indirectly) displacement of the ferrous oxide, and magnesia substituting for the displaced ferrous oxide, then with alumina being abstracted more and more from the spinel type mineral until the spinel type mineral approaches or reaches the form of a true magnesium chromite (spinel) contaminated to some extent with small amounts of ferrous oxide, calcium chromite and alumina, and, ultimately, with decomposition of the magnesium chromite spinel and the production of mineral bodies of indeterminate compositions. The altered spinel type mineral crystallizes in the fused product in particles of sufficient mass and sufficiently free of contamination with other minerals or compounds contained in the fused product that they may be separated and recovered from such other minerals or compounds by concentration methods employing the principle of separation by virtue of differences in specific gravities (gravity concentration methods, including for example, tabling, hindered settling and hydraulic classification) and by concentration methods employing the principle of separation by virtue of differences in affinities of chemical reagents (flotation cencentration methods). The spinels and other minerals and compounds associated therewith in the fused products have different magnetic susceptibilities and, therefore, magnetic separation methods may be adapted for separation and recovery of the spinels.

In preparing chromium-bearing materials for subsequent treatment by oxidation methods to produce chromate compounds, I may employ lime or magnesia or lime and magnesia in any suitable amounts. When the product of the fusion treatment is to be subjected to an oxidation treatment without concentration, I may employ lime or lime and magnesia in such an amount as to effect the production of a self-distintegrating used product, in an amount insufficient to effect the production of a self-disintegrating product, or in an amount in excess of the amount which will effect the production of a self-disintegrating product. When lime (or lime and magnesia) is employed in an amount in excess of the amount required to effect the production of a self-disintegrating product, I may provide lime in amount equivalent to or, preferably, in an amount in excess of the amount equivalent to two molecules of calcium oxide for each molecule of chromic oxide present in the product of the fusion treatment. The use of lime in an amount in excess of that equivalent to two molecules of calcium oxide for each molecule of chromic oxide permits the product of the fusion treatment to be subjected directly to the oxidation treatment with substantially complete conversion of the chromium to the chromate form. When the product of the fusion treatment is to be subjected directly to the oxidation treatment (without concentration) for chromate production and recovery, I prefer to employ lime sufficient to satisfy all acid components (other than chromic oxide) of the chromium-bearing material undergoing treatment and to provide an additional amount in excess (about ten percent (10%) in excess) of that equivalent to two molecules of calcium oxide for each molecule of chromic oxide present in the chromium-bearing material.

Suitable charges may be calculated as follows: Lime may be added in amount sufficient to replace the magnesium oxide (MgO) in the silicate portion of the chromite ore and the ferrous oxide (FeO) of the chromite; also to form with the alumina ($Al_2O_3$) di- or tri-calcium aluminate. For economy it is advisable to keep the lime at a minimum. A usual and practical way of determining the amount of lime (CaO) to add to the chromite is to consider only the chromic oxide ($Cr_2O_3$) content and add lime (CaO) to give one molecule of CaO to one molecule of $Cr_2O_3$ or two molecules of CaO to one molecule of $Cr_2O_3$ or three molecules of CaO to one molecule of $Cr_2O_3$, in which case there will be for most chromite ores sufficient lime to produce the desired results. Regardless of the method of calculation employed, the results are about the same and, of course, for economy, the lime (CaO) should be kept at a minimum for any particular ore, to give the highest chromic oxide ($Cr_2O_3$) content of the altered spinel.

In preparing chromium-bearing materials by means of fusion treatments for subsequent treatment by concentration methods, it is advisable to employ lime or lime and magnesia in such amounts and proportions as to effect the desired alteration of the spinel with minimum conversion of the chromic oxide to the acid-soluble condition consistent with economical operation under the economic conditions peculiar to the locality in which concentration is to be carried out.

In practicing the invention, fusion of a charge comprising chromite ore and lime may be carried out under neutral, oxidizing or reducing conditions. If fusion of the charge is carried out under controlled reducing conditions, some, or even substantially all, of the iron of the displaced ferrous oxide of the ferrous chromite may be reduced preferentially to the metallic state, leaving a large proportion, or even substantially all, of the chromium unreduced. When the fusion treatment is carried out at a temperature such that the charge becomes molten, the metallic iron and the unreduced chromium will be contained in separable molten metal and slag layers, respectively, and they may be separated by procedures well known in the metallurgical art. When the fusion treatment is carried out at a relatively low temperature of incipient fusion and under reducing conditions, the metallic iron formed will be distributed in the form of small particles throughout the residual non-metallic material containing the unreduced chromium. Separation of the metal particles from the non-metallic material may be accomplished by any suitable means.

In a preferred process of my invention, I simply heat the charge comprising spinel-bearing material and lime to a temperature of incipient fusion (cement kiln temperatures of about 1350° C. to 1500° C.) under non-reducing conditions to form an altered ore product containing all of the iron and chromium of the original chromium spinel-bearing material. Preferably, the composition of the charge subjected to the fusion treatment is so adjusted that the resulting product is self-disintegrating. The resulting self-disintegrating product may be subjected to the oxidation treatment directly (with addition of suitable reagents) or it may be subjected to a concentration treatment to obtain a concentrate for treatment by oxidation. When the self-disintegrating product of the fusion treatment is to be concentrated, it is first, preferably, digested with acid to dissolve its soluble components, and the insoluble residue is subjected to a gravity or flotation concentration treatment to recover a concentrate containing chromic oxide in higher concentration than in the original ore.

In another preferred process of my invention, employing reducing conditions during the fusion treatment, I practice controlled reduction, reducing the major portion of the iron of the displaced ferrous oxide and leaving unreduced the major portion of the chromium of the original ore. I thus obtain a metallic iron product relatively low in chromium and a non-metallic altered ore product beneficiated with respect to chromium by virtue of an increase in the ratio of chromium to iron resulting from the preferential or selective reduction of the iron of the original ore.

In practicing controlled reduction, I prefer to leave unreduced a substantial amount of displaced ferrous oxide, particularly when an acid treatment is to be employed subsequently to decompose the fused product. I have found that ferrous oxide disseminated throughout the fused material aids in decomposition by acid by permitting penetration of the acid between the grains or crystals of spinel.

When the fusion treatment is carried out at a temperature such that the charge becomes molten, controlled reduction may be practiced by including in the charge the amount of carbonaceous material required to reduce the amount of iron sought to be reduced. When the fusion treatment is carried out at a relatively low temperature of incipient fusion, controlled reduction is rather simple; iron is reduced readily at such low temperatures whereas chromium cannot be reduced to any substantial extent at such temperatures.

Controlled reduction may be carried out with any common reducing agent such as solid or gaseous carbonaceous materials, hydrogen, silicon, aluminum or a silicide, or, metallic chromium may be employed as a reducing agent for the ferrous oxide to simultaneously enrich the fused product in chromium. Reduction by means of metallic chromium must be carried out with the metallic chromium and the chromium-bearing material undergoing the reduction treatment in molten condition, and, in this type of operation, a relatively low-grade ferrochromium product may be used advantageously to supply the metallic chromium. Silicon-bearing reducing agents may be employed advantageously for controlled reduction of the displaced ferrous oxide when a self-disintegrating fused product is sought and when the chromium-bearing material undergoing treatment requires additional silica to form the amount of di-calcium silicate required to effect disintegration. When metallic chromium is reemployed as a reducing agent, the charge composition should be adjusted to include therein sufficient magnesium oxide or calcium oxide to combine with the chromic oxide resulting from reduction of the ferrous oxide as well as with the chromic oxide of the chromium-bearing material undergoing treatment. If the fusion treatment is to be followed by a concentration treatment, it is advisable to use magnesium oxide to form, with the oxidized chromium, the insoluble magnesium chromite. If the product of the fusion treatment is to be subjected to oxidation directly, it is advisable to use lime to form calcium chromite with the oxidized chromium and thus obtain a product which oxidizes readily to the chromate condition. Metallic chromium and elemental silicon may be used together as reducing agents advantageously in the form of ferrochrome silicon which may be produced by fusing the metallic iron product of the controlled reduction opration with coke and silica to reduce the silicon of the silica.

In the foregoing discussion, I have advanced a theory, which seems to be supported by experimental results, in an effort to explain the mechanism of alteration of chromite ore resulting from fusion of the ore with lime, but it is to be understood that I do not wish to be bound or limited by theoretical considerations. The results of my researches and experimentations definitely establish the fact of alteration resulting from fusion of chromite ore with lime. As the result of such fusion treatments, the iron of the ferrous oxide of chromite ore becomes more amenable to selective or preferential reduction by common reducing agents; the chromium of the chromic oxide of chromite ore becomes more readily oxidizable; the ferrous oxide of the chromite ore becomes more susceptible to attack by acids; and the chromic oxide becomes more amenable to recovery by ordinary concentration methods.

In concentrating chromite ore to produce a high-chromium concentrate in accordance with my invention, I may, as indicated above, fuse the ore under such conditions as to produce a self-disintegrating product or under conditions such as to produce a non-disintegrating product, and I may carry out the fusion treatment under reducing conditions to produce a beneficiated altered ore product or under non-reducing conditions to produce merely an altered ore product containing all of the iron and chromium present in the original ore. A self-disintegrating fused product of the invention readily disintegrates to form particles which are largely small enough to pass a 65-mesh screen, and the entire product may be ground readily to form particles small enough to pass a 200-mesh screen.

When a self-disintegrating fused product is produced, I may concentrate by means of acid methods, gravity concentration methods (such as water concentration or air separation) flotation concentration methods or any suitable combination of two or more of such methods. I may also employ a treatment including the use of an alkaline reagent such as caustic soda in any suitable combination with acid and other concentration treatments. The product of the fusion treatment may be decomposed with a hot solution of caustic soda by solution of the displaced alumina and with the production of sodium aluminate. When gravity concentration is employed, I may retreat the concentrate obtained with acid or alkali to further eliminate associated gangue materials. When a non-disintegrating product is formed, I may grind the product and subject the ground product to a gravity concentration treatment or to a flotation concentration treatment or both. In a preferred process, I concentrate the ground product by means of an acid treatment which may be followed by a gravity or flotation concentration treatment. In another preferred process, I subject the ground product to a gravity concentration treatment or to a flotation concentration treatment and thereafter treat the concentrate with acid to effect further elimination of impurities. A further preferred process involves treatment of the product of the fusion treatment with hot caustic soda to eliminate alumina and treatment of the residue with acid to further eliminate impurities. The sodium aluminate solution may be treated for the recovery of an alumina product.

In processes involving melting of the charges, the original charge materials may be employed in any suitable particle sizes. In processes involving sintering (incipient fusion) of the charges, the charge materials preferably are employed in the form of particles one-quarter inch and smaller in size. When a self-disintegrating product is to be formed by sintering (incipient fusion), I prefer to employ charge materials consisting essentially of particles minus 65 mesh in size or, more desirably, minus 100 mesh in size. If the components of the charge are to be employed in the form of particles of different sizes in the production of self-disintegrating altered ore products by fusion, it is advisable to employ the lime in the more finely divided condition (smaller particle size). (Screen sizes referred to in this application are based on the Tyler series.)

In treating any of the products of fusion treatments to form concentrates, I may first employ an acid treatment or an alkali treatment to decompose the fused product, and I may follow the acid treatment with a gravity or flotation or equivalent concentration treatment to recover a concentrate containing the altered spinel type mineral, or I may first employ a gravity or flotation or equivalent concentration treatment to recover a concentrate containing the altered spinel type mineral and subsequently subject the concentrate to an acid cleaning or concentrating treatment. If an alkali treatment is employed to decompose the ore, I prefer to treat the residue with acid to remove additional contaminants and form a relatively high grade chromium concentrate. Excess acid and dissolved and separated matter may be washed from the residual altered mineral by means of a water treatment or any other suitable treatment. The alumina-bearing residual products of the various concentration treatments after separation of the chromium concentrates may be treated by any known method for the recovery of alumina. The fusion treatments with lime so condition the alumina as to make it more readily recoverable by the usual alumina recovery processes involving the use of compounds of alkali metals to form alkali metal aluminates.

In treating the products of fusion treatments with acid, and, in cleaning concentrates resulting from various types of concentration treatments, I may employ any suitable acid in any suitable concentration capable of effecting the degree of decomposition sought to be accomplished. I have found hydrochloric acid and sulphuric acid to be entirely suitable for accomplishing effective decomposition of the fused products and concentrates. Aqueous solutions containing about ten to thirty percent (10 to 30%) hydrochloric acid (HCl) or sulphuric acid ($H_2SO_4$) can be employed to produce good results at temperatures ranging from ordinary atmospheric temperatures to boiling temperatures. Sulphuric acid treatments may be followed by roasting or fuming treatments at elevated temperatures to promote more effective decomposition of the fused products or concentrates and subsequently to decompose or break down sulphate compounds produced.

The following Examples (I to III) illustrate the production and recovery of high chromic oxide ($Cr_2O_3$) spinels with low silica and alumina produced by carrying out fusion and concentration treatments in accordance with my invention, employing chromite ore of the following analysis:

| | Per cent |
|---|---|
| $Cr_2O_3$ | 44.00 |
| FeO | 23.80 |
| $SiO_2$ | 6.20 |
| $Al_2O_3$ | 13.80 |
| MgO | 8.30 |
| CaO | 3.02 |

EXAMPLE I

A charge of the chromite ore was smelted in an electric furnace with lime sufficient to form a self-disintegrating altered ore and coke sufficient to reduce a portion of the displaced ferrous oxide with the production of a metallic iron product, the altered ore product and the metallic iron product were obtained in the molten state.

The altered ore product produced was separated from the metallic iron and cooled to permit disintegration. The self-disintegrating altered ore was passed through a 65-mesh screen to separate unaltered ore particles and any relatively large metal particles, and the screened product was treated in the form of a pulp with water on a concentrating table to form a tail product and a concentrate. The concentrate was re-treated with sulphuric acid to remove additional gangue materials, and a clean concentrate analyzing as follows was obtained:

| | Per cent |
|---|---|
| FeO | 2.8 |
| CaO | 2.3 |
| MgO | 14.1 |
| $Cr_2O_3$ | 73.0 |
| $Al_2O_3$ | 7.8 |
| $SiO_2$ | Nil |

EXAMPLE II

A charge consisting of ore and lime and containing the ore and lime in the proportions, four parts of ore to one part of lime (CaO), both by weight, was ground to about 100 mesh and heated to incipient fusion in a rotary kiln (at about 1350° C. to 1500° C.). The product disintegrated on cooling. The disintegrated product was concentrated by tabling an aqueous pulp of the same, and the concentrate was treated with acid. An altered ore (spinel) of the following analysis was obtained:

| | Per cent |
|---|---|
| $Cr_2O_3$ | 68.3 |
| FeO | 7.3 |
| $SiO_2$ | Nil |
| $Al_2O_3$ | 11.0 |
| CaO | 1.9 |
| MgO | 11.5 |

About 96.5% of the chromium oxide of the original ore was recovered in this product.

EXAMPLE III

A charge consisting of two parts by weight of ore and one part by weight of lime (CaO) was ground to approximately 100 mesh and sintered at about 1350° C. to 1500° C. This product did not disintegrate probably because of insufficient di-calcium silicate. When ground to 100 mesh, concentrated by tabling an aqueous pulp of the same and the concentrate treated with acid, it gave a product of the following analysis which contained 86.5% of the chromium oxide of the original ore:

| | Percent |
|---|---|
| $Cr_2O_3$ | 74.05 |
| FeO | 7.35 |
| $SiO_2$ | 1.10 |
| $Al_2O_3$ | 3.15 |
| CaO | 3.20 |
| MgO | 11.15 |

It will be noted that with the lesser amount of lime less alumina ($Al_2O_3$) was removed, also less soluble chromic oxide ($Cr_2O_3$) was formed, while, in the case of more lime, more chromic oxide ($Cr_2O_3$) was rendered soluble, but more alumina ($Al_2O_3$) was removed, and the product approached a pure magnesium chromite with minor quantities of impurities of silica ($SiO_2$), alumina ($Al_2O_3$), lime (CaO) and ferrous oxide (FeO).

Example IV below illustrates the production and recovery of a chromium concentrate and an alumina product when the fusion treatment is followed by treatment of the resulting product with an alkali metal compound.

EXAMPLE IV

A high-alumina ore of the following analysis was mixed with lime (CaO) in the proportions, one hundred (100) parts of ore to thirty (30) parts of lime (both by weight), and the mixture was ground to minus 100-mesh and sintered at about 1350° C. to 1500° C.:

*Ore analysis*

| | Percent |
|---|---|
| $Cr_2O_3$ | 33.00 |
| FeO | 13.90 |
| $Al_2O_3$ | 31.48 |
| $SiO_2$ | 4.71 |
| MgO | 11.56 |
| CaO | 2.40 |

The sintered product, in finely divided condition, was boiled at atmospheric pressure with an aqueous solution of caustic soda (NaOH) containing about 25 to 30 percent by weight of caustic soda. A solution containing about 75 percent of the alumina in the form of sodium aluminate was obtained upon boiling for about 20 minutes. The sodium aluminate solution was separated from the undissolved residue and treated according to a known method for the recovery of substantially pure alumina with regeneration of the caustic soda.

The residue remaining after separation of the sodium aluminate solution was treated with acid to remove soluble lime and iron oxide. The acid-treated residue, amounting to 51.7 percent by weight of the sintered product, analyzed as follows:

Concentrate analysis

| | Percent |
|---|---|
| $Cr_2O_3$ | 42.2 |
| FeO | 11.0 |
| $SiO_2$ | 1.5 |
| $Al_2O_3$ | 8.7 |
| CaO | 2.5 |
| MgO | 17.2 |

In practicing a process of the invention involving the treatment of a fusion product with caustic soda, of the type illustrated above, a saving in acid may be effected by subjecting the residue remaining after separation of the sodium aluminate solution to a water concentration treatment to remove or separate silica and the hydroxide of iron and calcium.

I may treat the products of the fusion treatments and the concentrates by any method known to the art of chromate production in order to effect oxidation of the chromium, and I may recover the oxidized chromium by any method known to the art of chromium recovery. The oxidized chromium may be recovered, for example, (either as an intermediate product or as a final product) as chromite, chromate or bichromate of any suitable composition. When I desire to prepare composite reagents for use in producing alloys containing chromium, I may first produce chromate or bichromate or a mixture of chromate and bichromate and, thereafter, heat the product to eliminate all or a portion of its oxygen content with the production of chromite or a mixture of chromite and chromate, as hereinbefore explained.

In treating the products of the fusion treatments directly to produce chromates, I prefer to form finely divided admixtures of the products of the fusion treatments with lime or lime and soda ash and roast the mixtures in air at temperatures above about 750° C. and below about 1000° C. until the desired degree or amount of conversion to chromate has been effected. I may employ lime and soda ash in any desired proportions, depending upon the end product sought to be obtained. If a calcium chromate product is sought, I employ lime sufficient to form calcium chromate with all of the chromium in the fused product together with a small amount of soda ash (1 to 5 percent by weight) to catalyze the oxidation reaction. The calcium chromate may be recovered from the product of the oxidation treatment by leaching with water or preferably with water containing a small amount of acid or bichromate in solution. The calcium chromate may be recovered from the leaching liquor by evaporation and crystallization or by precipitation with calcium hydroxide, or calcium chloride or both, using a small amount of sodium hydroxide to effect practically complete precipitation of calicum chromate. If an alkali metal bichromate is sought, I may employ lime sufficient to form calcium chromate with about half of the chromium present and soda ash sufficient to form sodium chromate with the remainder of the chromium. A solution containing chromates of sodium and calcium may be obtained by leaching the product of the roasting treatment with water. All of the chromium of the leaching liquor may be recovered in the form of sodium bichromate by treating the leaching liquor by known methods as, for example, with sulphuric acid or carbon dioxide to precipitate the calcium as sulphate or carbonate and, thereafter, subjecting the liquor to evaporation and crystallization treatments.

The concentrate products may be treated similarly to the direct products of the fusion treatments for the production and recovery of chromates. In a preferred process of the invention, I roast the concentrate products with lime sufficient to form calcium chromate with all of the chromium present and thus convert substantially all of the chromium to calcium chromate. In effecting such a conversion, I prefer to roast the concentrate in air in the form of a finely divided admixture with lime (or lime and a small amount of soda ash) at a temperature below 1000° C. and above 750° C. to convert the magnesium chromite to calcium chromate. A product thus formed may be treated for the recovery of a relatively pure chromate compound of any desired composition. Also, it constitutes a highly suitable reagent for use in forming exothermic mixtures to be used in the production of alloys containing chromium without treatment for the recovery of a relatively pure chromate compound, as it may be virtually or largely free of gangue materials, and the chromium combined as it is with calcium, is readily reducible at relatively low temperatures. Such a calcium chromate product contains an excess of oxygen over that required to oxidize the amount of silicon or other noncarbonaceous reducing agent necessary for the development of sufficient heat to melt the reaction products in exothermic mixtures containing sufficient reducing agent to reduce all of the chromium to the metallic state, and, under the circumstances, the use of the product directly in exothermic mixtures would involve wasting of reducing agent. Therefore, in employing the calcium chromate product, I prefer to subject it to a preliminary heat treatment to eliminate that portion of the oxygen which may be unnecessary for desirable exothermic reaction. For most purposes, elimination of about forty to seventy percent (40 to 70%) of the available oxygen produces satisfactory products consisting essentially of calcium chromite and calcium chromate contaminated with the small amounts of gangue materials associated with the concentrates roasted initially. Oxygen can be eliminated to the desired extent by heating the calcium chromate product in the solid state under controlled conditions to temperatures above about 1200° C.

Following is a specific example of a process of my invention illustrating a fusion treatment in which a molten fused product is formed, with fractional reduction of iron, and the non-metallic product of the fusion treatment is employed for chromate production.

Using an ore of the following analysis:

| | Percent |
|---|---|
| $Cr_2O_3$ | 44.00 |
| FeO | 23.60 |
| $Al_2O_3$ | 13.80 |
| $SiO_2$ | 6.20 |
| MgO | 8.30 |
| CaO | 3.02 |

I first smelt in a submerged arc furnace a charge comprising 1000 pounds of ore, 184 pounds of lime (CaO), 50 pounds of coke and 100 pounds of silica. The products resulting from this smelting operation are a metal high in iron and low in chromium, which is a by-product, and an altered ore product high in chromium and low in iron and which disintegrates to a fine powder.

The analysis of the altered ore product resulting from smelting the above charge, and after screening over a 60-mesh screen, was as follows: (Screening removes raw ore, metal and coarse particles.)

| | Percent |
|---|---|
| $Cr_2O_3$ | 39.20 |
| FeO | 3.98 |
| $SiO_2$ | 15.65 |
| $Al_2O_3$ | 13.40 |
| CaO | 19.80 |
| MgO | 8.05 |

The screen analysis was as follows:

| | Percent |
|---|---|
| −60 mesh+80 mesh | 27.6 |
| −80 mesh+100 mesh | 21.4 |
| −100 mesh+150 mesh | 24.1 |
| −150 mesh+200 mesh | 17.9 |
| −200 mesh | 9.0 |

This material is very fine and grinds with ease to minus 200 mesh, which particle size I prefer for making chromates. I may mix 100 parts of this altered ore product with 39 parts of lime and 26.3 parts of sodium carbonate, grind the mixture and roast the ground product with access of air at 900° C. to 1000° C. for from three-quarters of an hour to one hour in a rotary kiln or muffle furnace. With the material of the above screen analysis the conversion of the chromium to chromate is about 90%. If somewhat longer time is used for roasting, or if the amount of lime or soda ash used is increased slightly, the soluble chromate will reach 95% with ease. If the material is ground to pass 200 mesh, the conversion may be as high as 96.5% in three-quarters of an hour to one hour at 900° C. to 1000° C. It will be noted that the amount of soda ash employed is only 50% of that required to form sodium chromate with all chromium present. The remainder of the chromium appears as calcium and magnesium chromates.

The roasted product may be lixiviated in the usual manner, filtered, acidified with sulphuric acid to form calcium sulphate which may be removed by filtration, the liquor then evaporated and the sodium bi-chromate crystallized. Or a mixture of calcium chromate ($CaCrO_4$) and sodium chromate ($Na_2CrO_4$) may be crystallized and dehydrated.

It is not necessary to use only 50% of the required soda ash. The full amount required to form sodium chromate with the chromium present may be used, and it will reduce the roasting time to some extent. However, the roasting time is reduced with only 50% of the soda ash to almost a practical minimum. More soda ash than 50% has the effect of softening the mix and requiring more lime to facilitate complete oxidation. If a chromate product consisting largely of calcium chromate is desired, soda ash will be used only in small amounts to serve as catalyst and the lime employed will be increased accordingly.

The following example illustrates the use of concentrates produced in accordance with my invention to make chromates of calcium or sodium or both.

Using a concentrate made as above described and having the following analysis:

| | Per cent |
|---|---|
| $Cr_2O_3$ | 68.3 |
| FeO | 7.3 |
| $Al_2O_3$ | 11.0 |
| CaO | 1.9 |
| MgO | 11.5 |

I mix 100 parts of concentrate with 53 parts of lime (CaO) (approximately 10% excess for two molecules of CaO to one molecule of $Cr_2O_3$) and 5 parts of soda ash (soda ash may vary up to 50% of that required to make sodium chromate ($Na_2CrO_4$) but for calcium chromate ($CaCrO_4$) it should be kept at a reasonable minimum), grind to minus 100 mesh or finer and roast in a rotary kiln or other suitable furnace in an oxidizing atmosphere at a temperature of about 700° C. to 1000° C. The most rapid oxidation takes place at about 900° C. to 1000° C. and the chromic oxide ($Cr_2O_3$) is converted to chromate in from one-half hour to one hour. About 96% or more will be converted to chromate in this period of time at a temperature of about 1000° C. and under proper oxidizing conditions such as are attained in a rotary kiln. After the conversion to chromate is complete, the calcium chromate is recovered by known means such as dissolving in a slightly acid solution to give a solution of calcium bichromate from which calcium chromate or bichromate may be crystallized or otherwise recovered. The calcium bichromate or chromate may be converted to the corresponding chromates of sodium or potassium by treatment with corresponding carbonates or hydroxides of sodium or potassium and crystallizing in the usual manner. Likewise, the calcium chromate may be converted directly to chromic acid anhydride.

One of the important objects accomplished by this process is the production of calcium chromate direct, thus making it cheap enough to be used as a source of chromium in metallurgical work for producing chromium metal and chromium-bearing steels. For producing chromium-bearing steels, I prefer to use the dehydrated calcium chromate as an oxidant in exothermic mixtures containing non-carbonaceous reducing agents such as silicon and silicon containing alloys.

The ability to obtain calcium chromate or bichromate directly with high recoveries, I believe, is attributable in some measure at least to the altering of the chromite ore which gives a magnesium chromite with low impurities of silica ($SiO_2$), alumina ($Al_2O_3$) and ferrous oxide (FeO) and in which some lime is chemically combined with the chromic oxide ($Cr_2O_3$) and in a physical condition to oxidize readily to chromate when the additional base is supplied to form the chromate.

Following is a brief summary of some of the advantages of the chromate recovery processes of the invention:

1. Production of calcium chromate direct.
2. Saving in soda ash costs.
3. Saving in acid costs.
4. Increased recoveries.
5. Saving in grinding costs.
6. Reduction in times of reaction.

In the production of composite reagents for use in making steel and employing calcium chromate ($CaCrO_4$) from any source as a source of chromium, provision should be made for controlling temperatures which may be developed as a result of the exothermic reactions to insure the development of temperatures suitable for the particular operations in which the reagents are to be employed. Temperature control may be accomplished, for example, by controlling the total amount of available oxygen in a composite reagent or by diluting the composite reagent with a material which will absorb excess heat produced in the exothermic reaction, or, temperature control may be accomplished by combining available oxygen control with dilution. Reaction of pure calcium chromate with a reducing agent such as silicon, in a composite reagent consisting essentially of calcium chromate and a high-silicon silicon-containing reagent, would produce too much heat for good steel-making, and the silicon cost per pound of chromium recovered would be high. On the other hand, reaction of pure calcium chromate with a reducing agent such as silicon in a composite reagent containing an excess of diluent heat-absorbing material would produce too little heat for good steel-making.

In order to accomplish effective control of heat and temperature development, I may control the amount of available oxygen in a composite reagent through the inclusion of a chromium compound containing chromium in a lower state of oxidation than in calcium chromate, or by the inclusion of a diluent material such as lime or a metal of a type I wish to incorporate in the resulting metal product. In producing composite reagents, I prefer to employ as diluent materials, metals such, for example, as ferrochromium, ferrovanadium, ferrotungsten, ferromanganese, ferromolybdenum, nickel and copper. The excess heat is dissipated in melting the metals, and the silicon employed in developing the excess heat is employed for a useful purpose. If calcium chromate is to be employed as the sole source of chromium in the composite reagent and if no diluent material is to be used, the calcium chromate ($CaCrO_4$) should be broken down preliminarily to form a mixture of calcium chromite ($CaO \cdot Cr_2O_3$) and calcium chromate ($CaCrO_4$). About 50% of the chromium as chromic oxide ($Cr_2O_3$) and 50% as chromium trioxide ($CrO_3$) gives a good mix capable of developing sufficient heat for the reaction and to maintain the temperature of the steel bath. Various other proportions of chromic oxide and chromium trioxide may be employed advantageously. The proportion of chromium trioxide should be held to the minimum requirement for low silicon costs, low slag volume and high recoveries.

The following example illustrates the use of a composite reagent comprising an intimate mixture of ferro-chrome silicon with calcium chromite and calcium chromate present in equal proportions:

To make one ton of 12% chromium steel, I melt down in the ordinary way in an open hearth or electric furnace 1750 pounds of steel scrap and pig iron. The carbon is removed in the usual manner with mill scale or iron ore to a point under .10%. I then add 790 pounds of the finely divided, intimately mixed and dry mixture of calcium chromite, calcium chromate and ferro-chrome silicon containing approximately 33.8% chromium. The preliminary slag may be removed if desired or it may be left on the steel bath. Since the reaction producing chromium takes place chiefly within the exothermic mixture itself, it is not necessary to remove the slag in most cases. After the reaction is over, I tap and finish the steel in the ordinary manner. The recovery of the chromium is about 90% and the steel analyzes approximately 12% chromium and less than .10% carbon. The slag volume is about 400 to 600 pounds per ton of steel, depending upon pick-up from furnace lining.

I may modify the above procedure with equal and in some cases improved results by simply placing the exothermic mixture into the ladle and tapping the molten steel on to the mix. The reaction is rapid and well completed by the time the furnace is tapped.

The slag may be made as basic or acid as desired. In the above case the ratio of lime to silica in the slag is 1.17 CaO to 1 $SiO_2$. This type of slag gives good results but it may be more acid or more basic, depending on the type of furnace lining used, the result desired and the technical procedure followed.

Certain features of the disclosure of this application not claimed herein are disclosed and claimed in my copending application Serial No. 244,697, filed December 8, 1938 (now United States Patent No. 2,256,536, dated September 23, 1941).

Modifications of the methods herein described are disclosed in applicant's copending cases, Serial No. 351,128 filed Aug. 3, 1940; Serial No. 401,297 filed July 5, 1941; Serial No. 401,298 filed July 5, 1941; Serial No. 428,207 filed Jan. 26, 1942; Serial No. 435,438 filed March 19, 1942; and Serial No. 447,963 filed June 22, 1942.

I claim:

1. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C. and at least sufficiently high to cause a sintering of constituents of the charge and to produce a product containing an altered chromite formed by substitution of the basic compound for ferrous oxide of the chromite of the original chromium-bearing material, then oxidizing the altered chromite to form chromate, and recovering chromium in the form of chromate from the resulting oxidized product.

2. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C. and at least sufficiently high to cause a sintering of the constituents of the charge and to produce a product containing an altered chromite formed by substitution of the basic compound for ferrous oxide of the chromite of the original chromium-bearing material, then oxidizing the product of the heat treatment to form chromate, and recovering chromium in the form of chromate from the resulting oxidized product.

3. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to produce a sintered product containing an altered chromite formed by substitution of the basic compound for ferrous oxide of the chromite of the original chromium-bearing material, then oxidizing the altered chromite to form chromate, and recovering chromium in the form of chromate from the resulting oxidized product.

4. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to produce a molten product containing an altered chromite formed by substitution of the basic compound for ferrous oxide of the chromite of the original chromium-bearing material, then oxidizing the altered chromite to form chromate, and recovering chromium in the form of chromate from the resulting oxidized product.

5. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to produce a sintered product containing an altered chromite formed by substitution of the basic compound for ferrous oxide of the chromite of the original chromium-bearing material, then oxidizing the product of the heat treatment to form chromate, and recovering chromium in the form of chromate from the resulting oxidized product.

6. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to produce a molten product containing an altered chromite formed by substitution of the basic compound for ferrous oxide of the chromite of the original chromium-bearing material, then oxidizing the product of the heat treatment to form chromate, and recovering chromium in the form of chromate from the resulting oxidized product.

7. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to produce a sintered product containing an altered chromite formed by substitution of the basic compound for ferrous oxide of the chromite of the original chromium-bearing material, separating an altered chromite high in chromic oxide and low in alumina from nonmetallic material associated therewith in the sintered charge, then oxidizing the altered chromite to form chromate, and recovering chromium in the form of chromate from the resulting oxidized product.

8. The method of recovering chromium which comprises forming a charge comprising chromium-bearing material containing ferrous chromite and having alumina and silica associated therewith and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to produce a molten product containing an altered chromite formed by substitution of the basic compound for ferrous oxide of the chromite of the original chromium-bearing material, separating an altered chromite high in chromic oxide and low in alumina from non-metallic material associated therewith in the molten charge, then oxidizing the altered chromite to form chromate, and recovering chromium in the form of chromate from the resulting oxidized product.

9. The method of recovering chromium which comprises forming a charge comprising lime and chromium-bearing material containing ferrous chromite and having alumina and silica associated therewith, the lime being employed in an amount at least equivalent to a substantial proportion of the ferrous oxide of the chromium bearing material, heating the charge to a temperature above 1200° C. and at least sufficiently high to cause a sintering of constituents of the charge and to produce a product containing an altered chromite formed by substitution of the basic compound for ferrous oxide of the chromite of the original chromium-bearing material, then oxidizing the altered chromite to form chromate, and recovering chromium in the form of chromate from the resulting oxidized product.

10. The method of recovering chromium which comprises forming a charge comprising lime and chromium-bearing material containing ferrous chromite and having alumina and silica associated therewith, the lime being employed in an amount at least equivalent to a substantial proportion of the ferrous oxide of the chromium-bearing material, heating the charge to a temperature above 1200° C. and at least sufficiently high to cause a sintering of constituents of the charge and to produce a product containing an altered chromite formed by substitution of the basic compound for ferrous oxide of the chromite of the original chromium-bearing material, then oxidizing the product of the heat treatment to form chromate, and recovering chromium in the form of chromate from the resulting oxidized product.

11. The method of recovering chromium which comprises forming a charge comprising lime and chromium-bearing material containing ferrous chromite and having alumina and silica associated therewith, the lime being present in the charge in an amount in excess of that required theoretically to form di-calcium silicate with silica present in the charge, and the lime and silica in the charge being so proportioned and present in such quantities as to result, when the charge is heated to a temperature above 1200° C., in the production of a product capable of disintegrating upon cooling, heating the charge to a temperature above 1200° C. and at least sufficiently high to cause a sintering of constituents of the charge and to produce a product containing an altered chromite formed by substitution of the basic compound for ferrous oxide of the chromite of the original chromium-bearing material, then oxidizing the altered chromite to form chromate, and recovering chromium in the form of chromate from the resulting oxidized product.

12. The method of recovering chromium which comprises forming a charge comprising lime and chromium-bearing material containing ferrous chromite and having alumina and silica associated therewith, the lime being present in the charge in an amount in excess of that required theoretically to form di-calcium silicate with silica present in the charge, and the lime and silica in the charge being so proportioned and present in such quantities as to result, when the charge is heated to a temperature above 1200° C., in the production of a product capable of disintegrating upon cooling, heating the charge to a temperature above 1200° C., and at least sufficiently high to cause a sintering of the constituents of the charge and to produce a product containing an altered chromite formed by substitution of the basic compound for ferrous oxide of the chromite of the original chromium-bearing material, then oxidizing the product of the heat treatment to form chromate, and recovering chromium in the form of chromate from the resulting oxidized product.

MARVIN J. UDY.